US012336556B2

(12) United States Patent
Toledo et al.

(10) Patent No.: US 12,336,556 B2
(45) Date of Patent: Jun. 24, 2025

(54) COMPOSITIONS FOR RETARDING RANCIDITY IN OIL-BASED FOOD SAUCES AND DRESSINGS

(71) Applicant: Kerry Group Services International Limited, Tralee (IE)

(72) Inventors: Romeo Toledo, Hull, GA (US); Richard S. Hull, Athens, GA (US); Bilal Kirmaci, Athens, GA (US); Mo Mui Toledo, Hull, GA (US)

(73) Assignee: Kerry Group Services International Limited, County Kerry Tralee (IE)

( * ) Notice: Subject to any disclaimer, the term of this patent is extended or adjusted under 35 U.S.C. 154(b) by 29 days.

(21) Appl. No.: 16/281,016

(22) Filed: Feb. 20, 2019

(65) Prior Publication Data

US 2019/0254327 A1 Aug. 22, 2019

Related U.S. Application Data

(60) Provisional application No. 62/632,746, filed on Feb. 20, 2018.

(51) Int. Cl.
| | |
|---|---|
| *A23L 33/105* | (2016.01) |
| *A23B 4/00* | (2006.01) |
| *A23B 4/03* | (2006.01) |
| *A23L 33/00* | (2016.01) |
| *A23L 33/10* | (2016.01) |

(52) U.S. Cl.
CPC .............. *A23L 33/105* (2016.08); *A23B 4/00* (2013.01); *A23B 4/03* (2013.01); *A23L 33/00* (2016.08); *A23L 33/10* (2016.08)

(58) Field of Classification Search
CPC . A23B 4/03; A23L 33/00; A23L 33/10; A23L 33/105; C11B 5/00
See application file for complete search history.

(56) References Cited

U.S. PATENT DOCUMENTS

| | | | |
|---|---|---|---|
| 8,182,858 B2 * | 5/2012 | Toledo | A23B 4/12 426/652 |
| 2004/0081740 A1 | 4/2004 | Berasategui | |
| 2005/0163880 A1 | 7/2005 | Pusateri et al. | |
| 2009/0098254 A1 | 4/2009 | Baublits et al. | |
| 2013/0078352 A1 * | 3/2013 | Jourdain | A23D 9/06 426/545 |
| 2014/0295041 A1 | 10/2014 | Dodd | |
| 2015/0050401 A1 | 2/2015 | Toledo | |
| 2017/0107468 A1 | 4/2017 | Roozen et al. | |

FOREIGN PATENT DOCUMENTS

| | | |
|---|---|---|
| JP | 2017-216943 A | 12/2017 |
| WO | 92/08361 A1 | 5/1992 |
| WO | 2010/061921 A1 | 6/2010 |
| WO | 2014/102302 A1 | 7/2014 |

OTHER PUBLICATIONS

Ronzio, R., The Encyclopedia of Nutrition and Good Health, 2nd edition, 2003, p. 155 (Year: 2003).*
Brewer, M.S., "Natural Antioxidants: Sources, Compounds, Mechanisms of Action, and Potential Applications", Comprehensive Reviews in Food Science and Food Safety, vol. 10, 2011, pp. 221-247 (Year: 2011).*
Heck, M., "Easy Marinades with 5 Ingredients or Less", Bon-Appetit, 2012 (Year: 2012).*
"Definition of Marinade", Merriam-Webster, 2017 (Year: 2017).*
Hach, "pH Meters", 2015 (Year: 2015).*
"Why food spoils?", Feb. 15, 2018, Icona (Year: 2018).*
Echo Echo, "Finger-Licking Chicken Marinade", 2017, Food.com, https://web.archive.org/web/20170917020211/http://www.food.com:80/recipe/finger-licking-chicken-marinade-88939 (Year: 2017).*
"Salad dressing as a marinade", 2012, Backyard Boss, https://www.backyardboss.net/forum/t/salad-dressing-as-a-marinade.1401/ (Year: 2012).*
International Search Report and Written Opinion mailed on Apr. 22, 2019 in International Application No. PCT/US2019/018840.
Extended European Search Report issued Oct. 6, 2021 in European Application No. 19756659.9.
Righetto et al., "Chemical Composition and Antioxidant Activity of Juices from Mature and Immature Acerola (*Malpighia emarginata* DC)", Food Sci Tech Int, 2005, vol. 11, No. 4, pp. 315-321 (7 pages total).
Leffa et al., "Corrective effects of acerola (*Malpighia emarginata* DC.) juice intake on biochemical and genotoxical parameters in mice fed on a high-fat diet", Mutation Research, 2014, vol. 770, pp. 144-152 (9 pages total).
Wechtersbach et al., "Liposomal stabilization of ascorbic acid in model systems and in food matrices", LWT—Food Science and Technology, 2012, vol. 45, pp. 43-49 (7 pages total).
Communication dated Jan. 8, 2025 in European Application No. 19 756 659.9.
Jafar, et al., "Stabilization by Antioxidants of Mayonnaise Made From Fish Oil", Journal of Food Lipids, 1994, vol. 1, pp. 295-311 (17 pages).
Gorji, et al., "Lipid oxidation in mayonnaise and the role of natural antioxidants: A review", Trends in Food & Science Technology, 2016, vol. 56, pp. 88-102 (15 pages).

* cited by examiner

*Primary Examiner* — Nikki H. Dees
*Assistant Examiner* — Kelly P Kershaw
(74) *Attorney, Agent, or Firm* — Sughrue Mion, PLLC

(57) ABSTRACT

Rate of rancid flavor development in oil-based sauces and dressings can be slowed down by addition of a mixture containing sequestering agents for dissolved oxygen and heavy metal ions that are derived from vinegar and fruit juices. The types and proportions of the components of the mixture are chosen to promote a balance of flavor and color neutrality and adequacy of sequestering both heavy metal ions and dissolved oxygen. The mixture is effective in retarding development of rancid flavor moieties of hydroperoxides and hexanal, similar to a commonly-used chemical sequestrant, ethylene diamine tetra acetate (EDTA).

26 Claims, No Drawings

COMPOSITIONS FOR RETARDING RANCIDITY IN OIL-BASED FOOD SAUCES AND DRESSINGS

CROSS-REFERENCE TO RELATED APPLICATIONS

This application claims the benefit of U.S. Provisional Application No. 62/632,746, filed Feb. 20, 2018, which is incorporated by reference herein in its entirety.

BACKGROUND

Oil-based sauces and dressings such as salad dressings and mayonnaise are very susceptible to oxidative rancidity because of unsaturated fatty acids in the oil and the incorporation of oxygen during the process of mixing and homogenization. Oxidative rancidity is the result of the reaction between oxygen and unsaturated fatty acids. Rancidity, an off-flavor note in the product, can cause rejection of the product and can result in customer complaints.

SUMMARY

Various embodiments of the present invention provide compositions effective in retarding rancidity development in a wide variety of lipid-containing food products, most notably those where lipids containing unsaturated fatty acids form the largest component of the mixture. In some embodiments, the compositions of the present invention may also be effective in preventing discoloration, for example, when metal ions incidentally transfer to the product from ingredient water or contact with processing equipment. The compositions of embodiments of the present invention comprise ingredients derived from naturally-occurring and well-known plant sources, which can act as effective sequestering agents and can replace the commonly-used EDTA and chemical antioxidants.

In some embodiments, the compositions of the present invention comprise a heavy metal ion sequestrant comprising a lemon juice component and a vinegar component; and a dissolved oxygen sequestrant comprising a fruit juice comprising Vitamin C.

In some embodiments, the lemon juice component comprises a combination of lemon juice concentrate and neutralized lemon juice concentrate. In some embodiments, the lemon juice concentrate comprises 400 gpl lemon juice concentrate; and the neutralized lemon juice concentrate comprises 400 gpl lemon juice concentrate neutralized with a neutralizing agent comprising sodium bicarbonate, potassium carbonate, or a mixture thereof. In alternate embodiments, sodium carbonate, potassium bicarbonate, or a mixture thereof may be used. In some embodiments, the neutralized lemon juice concentrate has a pH of about 6.8.

In some embodiments, the vinegar component comprises a combination of vinegar and concentrated neutralized vinegar. In some embodiments, the vinegar comprises 300 grain vinegar; and the concentrated neutralized vinegar comprises 300 grain vinegar neutralized with a neutralizing agent comprising sodium bicarbonate, potassium carbonate, or a mixture thereof, and concentrated by evaporation. In some embodiments, the concentrated neutralized vinegar comprises neutralized vinegar concentrated to about 82% of its original weight.

In some embodiments, the dissolved oxygen sequestrant comprises a fruit juice concentrate or powder. In some embodiments, the dissolved oxygen sequestrant comprises at least one of Jamaican cherry concentrate, acerola concentrate, acerola powder, kakadu plum powder, and camu camu powder.

In some embodiments, the compositions are shelf-stable at ambient temperatures above 5° C.

In some embodiments, the composition has a water activity below about 0.85.

In some embodiments, the composition has a pH of about 4.0 to about 4.5.

In some embodiments, wherein the composition is formulated for usage at about 0.10% to about 0.50% of product weight.

In some embodiments, the product comprises an oil-based sauce or dressing.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

DETAILED DESCRIPTION

Oxidation of fats is the most predominant source of off-flavor in food products containing unsaturated fatty acids, such as oil-based food sauces and dressings. When the fatty acid in fat is oxidized, volatile shorter-chain compounds such as acids and aldehydes are formed. These oxidation products have objectionable flavors commonly known as rancid.

The oxidation reaction is catalyzed by heavy metal ions present in the continuous phase of the oil-based sauce or dressing. To slow down the rate of reaction, the catalyst and the reactant, oxygen, should be prevented from taking part in the reaction. This can be accomplished by chemical sequestration by one or more sequestering agents (sequestrants)—for example, where an ingredient is added to bind the heavy metal ions thus preventing them from catalyzing the oxidation reaction, and another ingredient is added to bind dissolved oxygen thus removing a reactant in the oxidation reaction. Both approaches to slow down the rate of oxidation employ a mechanism of sequestration where the likely participants in the reaction are "set apart" (Merriam-Webster definition of "sequester") or removed.

The use of chemical sequestration of potential reactants to prevent flavor and/or color changes in foods is a known food technological practice. A publication by the National Academy of Sciences-National Research Council (Chemicals Used in Food Processing, Publ. 1274, NAS-NRC, 1965) lists sequestrants and antioxidants added to foods. The listed sequestrants include diacetate; acetate salts of sodium, potassium, and calcium; and citrate salts of sodium, potassium, and calcium. Also listed as sequestrants are citric acid and EDTA and its salts. Esters of citric acid with isopropyl alcohol, glycerol, and ethyl alcohol are listed as well. These sequestrants are used in a variety of products, which include oleo margarine, non-standardized dressings, coffee creamers, and rendered animal fat. All these known food additives are chemical in nature.

However, the recent trend in consumer preference is for food products that contain only familiar terms on the label and none of the synthetic, chemical-sounding terms. This trend has led to the search for ingredients derived from fruits, plants, or mineral sources. Compositions that include alternative sequestrants, derived from naturally-occurring and well-known plant sources, are needed in the art to satisfy consumers' desire for readily recognizable ingredients declared on a food label.

The use of heavy metal ion sequestrants alone is usually not effective in retarding rancidity. Antioxidants such as alpha-tocopherol, ascorbic acid, and propyl gallate, are known dissolved oxygen sequestrants, but the presence of heavy metal ions reduces their effectiveness in preventing lipid oxidation and slowing down rancidity development in poly-unsaturated fatty acids. Thus, to be effective, sequestrants to isolate the heavy metal ions should preferably be used in combination with an antioxidant which sequesters oxygen to achieve a synergistic effect in reducing the rate of rancidity development in oil-based sauces and dressings.

When developing products with effective metal chelating capability and effective oxygen sequestration to retard rate of rancidity development, it is important to consider how much heavy metal chelation is needed relative to oxygen sequestration. EDTA can be replaced by a combination of citrates from lemon juice and acetates from vinegar. However, to effectively chelate heavy metal ions by vinegar and lemon juice, an adequate level of citrates and acetates as well as citric acid and acetic acid should be present since chelation is also dependent on acidity as manifested by product pH. In addition, to replace ascorbic acid it is preferred to use a fruit juice containing a high concentration of ascorbic acid to avoid imparting an unnecessary off-flavor to the product from the inherent flavor of the juice.

Typically, EDTA as a sodium and calcium salt is used for heavy metal ion sequestration and an antioxidant such as ascorbic acid or propyl gallate is used to sequester dissolved oxygen. Citric acid and its salts have weak heavy metal chelating activity. Likewise, salts of acetic acid have weak heavy metal chelating activity. Thus, EDTA can be replaced by a combination of buffered vinegar and buffered lemon juice if these can be used at high enough concentration in a product without adversely affecting flavor. Use levels of these sequestrants listed in the NAS-NRC publication can provide a guide in formulating potential mixes used for heavy metal ion sequestration. For example, when used in a formulated product, citric acid may be used from about 10 ppm to about 100 ppm (parts per million) while citrate salts may be used at about 1000 ppm. Acetate salts and diacetates may be used from about 200 ppm to about 500 ppm. EDTA is typically used at about 25 ppm to about 1000 ppm in various foods, but is regulated in mayonnaise and salad dressings to a maximum of 75 ppm. These usage levels were used as a starting point for developing formulations suitable for use in oil-based sauces and dressings. Since the ingredients listed above have chemical names, a key activity in formulating the compositions of the present invention was identifying and determining amounts of alternative natural ingredients (e.g., fruit juice and vinegar components) that could deliver comparable sequestration capability and exhibit a retarded rate of oxidation of unsaturated fatty acids in oil-based sauces and dressings.

To produce food products that can satisfy consumers' desire for more friendly and/or familiar terms in the ingredient list rather than chemical names, fruit juices rich in organic acids such as citric acid and ascorbates were selected. Vinegar, a more consumer-friendly term than acetic acid, was also selected. Toledo (U.S. Pat. No. 8,182,858, incorporated by reference herein in its entirety) used a similar approach in creating mixtures that substitute for diacetates and citrates to promote effective moisture management in raw and ready to eat meats and to inhibit proliferation of pathogenic and spoilage bacteria to impart food safety and extend shelf-life.

Although fruit juice and vinegar based sequestrants have weaker heavy metal ion chelation properties compared to EDTA, proper formulation using effective concentrations can overcome the difference. Citric acid is a naturally-occurring compound in lemon juice and contains three $H^+$ ions. When lemon juice concentrate is neutralized with sodium bicarbonate or potassium carbonate, trisodium/potassium, disodium/potassium, and monosodium/potassium citrates are formed. The sequestrant mixtures of embodiments of the present invention preferably include a level of citric acid that is high enough for effective heavy metal ion chelating activity without being so high as to impart an excessive sour flavor note when combined with flavor-neutral neutralized lemon juice concentrate. The same applies for the level of acetic acid when formulating mixtures of neutralized and non-neutralized vinegar.

Ascorbic acid is an antioxidant and can be used to sequester dissolved oxygen.

Vitamin C is the natural form of ascorbic acid found in fruits such as orange, cherry, camu camu, and kakadu plum. Juice from a particular type of cherry, the Jamaican cherry (*Muntingia calabura*) or acerola (*Malpighia emarginata*), can be obtained as a concentrate or powder containing up to 17% or 34% Vitamin C, respectively. Other high ascorbic acid-containing fruit products commercially available include camu camu (*Myrciaria dubia*) powder and kakadu plum (*Terminalia ferdinandiana*) powder, which contain up to 12% and 13% Vitamin C, respectively. In some embodiments, one of these commercially-available Vitamin C sources (or a combination thereof) may be used as the oxygen-sequestering component in the sequestrant mixture. In other embodiments, different fruit juice concentrates, powders, or combinations thereof may be used.

In developing the natural (e.g., fruit juice and vinegar based) sequestrant formulations of embodiments of the present invention, initial experiments involved trial formulations containing various proportions of the following chemical components: sodium diacetate, trisodium citrate, citric acid, and ascorbic acid. Effectiveness as a chelator was tested on raw shrimp for inhibition of melanosis. Although the test was a different application, they are similar in the type of reaction that produces the dark brown color. Shrimp melanosis is the result of the reaction between oxygen and tyrosine catalyzed by the enzyme tyrosinase. Tyrosine comes from proteins broken down by proteolytic enzymes in the shrimp and the oxidation reaction is catalyzed by the enzyme tyrosinase normally present in the digestive organ of the shrimp. The advantage of the shrimp system for evaluating antioxidant activity of a formulated mixture is the simplicity of evaluating the end product of oxidation as manifested by the color change and the rapidity of the reaction which occurs within a matter of days at 5° C. The result of these experiments on shrimp showed that enzymatic oxidation can be prevented by including in the treatment mix an ingredient capable of sequestering oxygen. The effective mixture consisted of trisodium citrate, citric acid, sodium diacetate, and ascorbic acid. One example of an effective mix of sequestering agents for metal ions and oxygen capable of preventing shrimp melanosis is shown in Table 1. All percentages listed herein are by weight.

TABLE 1

| Ingredient | Amount |
| --- | --- |
| Citric acid | 23.8% |
| Trisodium citrate | 34.4% |
| Sodium diacetate | 30.0% |
| Ascorbic acid | 11.8% |

The chemical mixture shown in Table 1 is just one example of a formulation that can be effective in sequestering metal ions to avoid color changes in foods and act as a barrier to prevent oxygen from taking part in oxidative reactions. The amount of each component used in a food to achieve the desired result may be determined based on factors such as the storage temperature, the quantity of ions needing sequestration, and the amount of reactant present in the food being treated. The effective percentage of each component may vary slightly depending upon whether sodium or potassium salts are used or varying ratios of sodium to potassium salts are used.

In embodiments of the present invention, a composition comprising a mixture of fruit juices and vinegar was formulated, which could replace the formulation with synthetic chemical constituents.

In an illustrative embodiment, a mixture containing the active ingredients listed in Table 1 was formulated from natural ingredients, using a vinegar mix (vinegar and neutralized vinegar) as the source of diacetate, a lemon mix (lemon juice and neutralized lemon juice) as the source of the citrate and citric acid, and cherry juice concentrate as the source of ascorbic acid. Citric acid was sourced from lemon juice concentrate (LJC). 400 gpl (grams per liter) LJC contains 36.5% citric acid. Trisodium citrate was sourced from neutralized LJC by reacting LJC with sodium bicarbonate as described in U.S. Pat. No. 8,182,858 to obtain a citrate salt with a pH of about 6.8. The neutralized LJC produced from LJC containing 33% citric acid contained citrate salts at a mass fraction of 0.400 in the neutralized 400 gpl LJC. Sodium diacetate was provided by neutralized 300 grain vinegar combined with unreacted 300 grain vinegar to obtain equimolar concentrations of acetate salts and acetic acid, as described in U.S. Pat. No. 8,182,858. The ascorbic acid was added as Vitamin C from a fruit juice concentrate containing a high concentration of Vitamin C. In this embodiment, cherry juice concentrate (acerola) containing 17% Vitamin C was used. The percentages can be converted to mass fractions by dividing by 100.

Table 2 shows one example of a composition according to the present invention, wherein natural ingredients with non-chemical names are used to replace the active ingredients in the formula made with compounds with chemical names. Also shown in Table 2 are the mass fractions of the active components and the masses of the added ingredients. The final mix containing the desired active ingredients is also shown in Table 2.

TABLE 2

| Natural ingredient | Active component | Mass fraction of active component | Mass of natural ingredient | % in formula with non-chemical names |
| --- | --- | --- | --- | --- |
| LJC | Citric acid | 0.365 | 65.2 | 22.2 |
| Neutralized LJC | Trisodium citrate | 0.400 | 86.0 | 29.2 |
| Vinegar + Neutralized Vinegar | Sodium diacetate | 0.407 | 73.7 | 25.0 |
| Acerola | Ascorbic acid | 0.17 | 69.4 | 23.6 |
| Total | | | 294.3 | 100 |

In some embodiments of the present invention, when using fruit juices and vinegar as the primary sources of the active components, concentrates may be preferred, for example, to minimize volume on storage and distribution, and to prevent off-flavors and/or off-color from being imparted at the effective usage level. In some embodiments, the water activity does not exceed 0.85. The compositions according to embodiments of the present invention are also preferably shelf-stable. In some embodiments, an antimicrobial component is included.

The method of neutralization of LJC may be substantially as described in U.S. Pat. No. 8,182,858. The neutralizing agent may be, for example, sodium bicarbonate, potassium carbonate, a mixture of sodium bicarbonate and potassium carbonate, or other suitable agent capable of neutralizing citric acid. In some embodiments, before neutralization, it may be preferred, for example, to set a ratio of sodium to potassium salt desired in the product, and calculate the amounts of sodium bicarbonate and potassium carbonate as described, for example, in U.S. Pat. No. 8,182,858. The mass fraction of citrate salts in the neutralized LJC is then calculated and the amount of neutralized LJC which delivers the amount of citrate salt as specified in the Table 1 formula can then be calculated. The amount of LJC required in the formula can be obtained by dividing citric acid required in the Table 1 formula by the mass percent of citric acid in the 400 gpl LJC.

The acetate salt may be provided, for example, by neutralized, concentrated vinegar. Vinegar neutralization may be performed using the procedures described in U.S. Pat. No. 8,182,858. The neutralized vinegar may be then concentrated (e.g., also as described in U.S. Pat. No. 8,182,858 or by another suitable method). In some embodiments, the neutralized vinegar may be concentrated by evaporation to about 82% by weight of the neutralized vinegar before evaporation (or other desired level, such as ⅖ to ⅗ of the original weight). Industrial strength vinegar (e.g., a high grain vinegar, such as 200-300 grain vinegar, preferably 300 grain vinegar) may be used as the source of acetic acid and acetates. To obtain the diacetate needed in the formula, the mole fraction of diacetate can be calculated from that specified in the Table 1 formula and divided by two. The half of diacetate mole fraction multiplied by the molecular weight of acetic acid will be the mass fraction of acetic acid. The other half multiplied by the molecular weight of the acetate salt, as potassium or sodium salt or both will be the required mass of acetate salt. This amount divided by the mass fraction of acetate salt in the concentrated neutralized vinegar will be the mass of concentrated neutralized vinegar required.

The amount of cherry (or other fruit) juice concentrate or powder needed can be calculated from the mass of ascorbic acid in the Table 1 formula divided by the mass fraction of ascorbic acid in the cherry juice concentrate, cherry powder, camu camu powder, kakadu plum powder, or other fruit juice concentrate or powder.

Although the procedures described in U.S. Pat. No. 8,182,858 may be followed generally to prepare components of the sequestrant mix of embodiments of the present invention, there may be differences, for example, in the proportions and composition of the sequestrant mix of embodiments of the present invention as compared to that patent. One reason for the differences is that the product described in U.S. Pat. No. 8,182,858 was specifically formulated to have antimicrobial properties, whereas the sequestrant mix of embodiments of the present invention was not formulated as an antimicrobial (though it may still have certain antimicrobial properties).

Natural ingredient composition may vary, for example, from one growing season to the next and/or from one growing location to another. The uncertainty of weather during the growing season may result in unavailability of ingredients from one location and it may be necessary to change the type of fruit needed to supply the active ingredient. The procedures described herein can provide helpful guidance when making substitutions of fruit source and type.

The compositions of embodiments of the present invention, such as the Lemon/Vinegar/Cherry Mix (sequestrant mix) described above, preferably have a pH between 4.0 and 4.5 to remain stable at room temperature. Usage level of the liquid compositions as a chelating agent may be, for example, about 0.10% to about 0.50% of product weight. Selection of the actual concentration may be based, for example, on flavor impact, cost, and/or degree of inhibition against off-flavor development due to presence of heavy metal ions. The compositions of the present invention may also be used to inhibit microbial growth in food products at higher usage levels; however, effects on flavor may need to be ascertained when using the compositions at high concentrations in the product.

The following Examples describe various tests that were conducted to determine the efficacy of formulations using all-natural ingredients to delay the development of rancid flavors in an oil-based salad dressing.

EXAMPLES

Example 1

This test was performed using a Lemon/Vinegar Mix having the formulation shown in Table 3. The objective was to determine if a sequestrant mix containing only known metal ion sequestering ingredients, and no oxygen sequestering component, would be effective in delaying rancidity development.

TABLE 3

| Ingredient | Amount |
| --- | --- |
| Neutralized vinegar concentrated to 82% of neutralized weight | 45.32% |
| 300 grain vinegar | 4.68% |
| Neutralized lemon juice concentrate | 27.5% |
| Non-neutralized lemon juice concentrate 400 gpl | 22.5% |

In this test, treatment #1 was a mix with the formula shown in Table 3 added to a test salad dressing at 0.55% (w/w); treatment #2 was EDTA at 75 ppm added to the test salad dressing; and treatment #3 was the test salad dressing alone without any additives. The test salad dressing was obtained from a salad dressing manufacturer who made the product the same day it was shipped to the testing laboratory. To prevent microbial spoilage during the duration of the test, 200 ppm sodium azide was added to each of the treatments. Samples were placed in acid washed gas chromatography (GC) vials, and then stored at 20 and 37° C. in the dark. Hexanal, one of the volatile compounds causing the rancid off-flavor, was measured by gas chromatography (GC-2014 Shimadzu). All samples stored at 20° C. did not exhibit the oxidation product, hexanal, during the entire duration of the test. For samples stored at 37° C., end of the lag phase of hexanal production, a sign that rancid off-flavor was manifested, occurred in approximately 60 days for treatment #1, while for treatment #2 this same point in the oxidation curve represented by hexanal production occurred at 85 days. There was no difference in the length of the lag phase between treatment #1 and treatment #3 indicating that the additives used in treatment #1 did not retard the rate of oxidation. The other intermediate product of the oxygen-unsaturated fatty acid reaction, lipid hydroperoxides, were at similar levels at the same storage time in treatment #1 and treatment #3 indicating that no inhibition of formation of lipid hydroperoxides occurred in both treatments #1 and #3. EDTA in treatment #2 gave reduced lipid hydroperoxide levels 42% less than in those of treatments #1 and #3. These results indicate that just the Lemon/Vinegar Mix may have inadequate heavy metal chelating capacity to inhibit lipid oxidation during storage.

The test described in Example 1 was performed to determine whether the sequestrant mix could be effective if the Vitamin C component was not added, for example, because of problems in procuring the ingredient.

Example 2

This test was performed using a Lemon/Vinegar/Cherry Mix having the formulation shown in Table 4.

TABLE 4

| Ingredient | Amount |
| --- | --- |
| Acerola powder | 11.83% |
| Neutralized vinegar concentrated to 82% of neutralized weight | 12.21% |
| 300 grain vinegar | 14.84% |
| Neutralized lemon juice concentrate | 28.97% |
| Non-neutralized lemon juice concentrate 400 gpl | 32.15% |

In this test, treatment #1 was a mix with the formula shown in Table 4 added to a test salad dressing at 0.11% (w/w); treatment #2 was EDTA at 75 ppm added to the test salad dressing; and treatment #3 was the test salad dressing alone without any additives. The test salad dressing was obtained from a salad dressing manufacturer who made the product the same day it was shipped to the testing laboratory. To prevent microbial spoilage during shelf-life determination, 200 ppm sodium azide was added to each sample. Samples were placed in acid washed gas chromatography (GC) vials, and then stored at 20 and 37° C. in the dark. Hexanal, one of the volatile compounds causing the rancid off-flavor, was measured by gas chromatography (GC-2014 Shimadzu). All samples that were stored at 20° C. showed zero hexanal levels during the entire duration of the test indicating that no oxidation occurred. Oxidation curves represented by hexanal in the headspace of the reaction vial consisted of a lag phase and an exponential rise in hexanal level with time. Rancid flavor was detected in the samples when the lag phase of hexanal production ends and exponential increase begins. End of the lag phase of hexanal production in the samples was 85 and 90 days for treatments #2 and #1, respectively. End of the lag phase in treatment #3 was 70 days. Formation of lipid hydroperoxides, a primary oxidation product, was also measured using a modified version of the International Dairy Federation method. Treatments #1 and #2 exhibited 32% and 42% less hydroperoxide formed, respectively, relative to treatment #3. These results showed that the Lemon/Vinegar/Cherry Mix was effective inhibiting lipid oxidation during storage, thus it can be used to replace EDTA in oil-based sauces and dressings.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, any feature(s) in one or more embodiments may be applicable and combined with one or more other embodiments. Hence, it is not desired to limit the invention to the exact compositions and processes shown and described and, accordingly, all suitable modification equivalents may be resorted to falling within the scope of the invention as claimed. It is the intention, therefore, to be limited only as indicated by the scope of the claims appended hereto.

What is claimed is:

1. A fruit juice and vinegar based composition for retarding rancidity development in a lipid-containing food product, comprising:
   a heavy metal ion sequestrant comprising a lemon juice component and a vinegar component; and
   a dissolved oxygen sequestrant comprising a fruit juice comprising Vitamin C,
   wherein the lemon juice component comprises a combination of lemon juice concentrate and neutralized lemon juice concentrate,
   wherein the vinegar component comprises a combination of vinegar and concentrated neutralized vinegar,
   wherein a content of the Vitamin C in the composition is at least 4.0 wt. % when a total weight of the composition is 100 wt. %, and
   wherein the composition has a pH of about 4.0 to about 4.5.

2. The composition of claim 1, wherein the lemon juice concentrate comprises 400 gpl lemon juice concentrate, and wherein the neutralized lemon juice concentrate comprises 400 gpl lemon juice concentrate neutralized with a neutralizing agent comprising sodium bicarbonate, potassium carbonate, or a mixture thereof.

3. The composition of claim 1, wherein the neutralized lemon juice concentrate has a pH of about 6.8.

4. The composition of claim 1, wherein the vinegar comprises 300 grain vinegar, and wherein the concentrated neutralized vinegar comprises 300 grain vinegar neutralized with a neutralizing agent comprising sodium bicarbonate, potassium carbonate, or a mixture thereof, and concentrated by evaporation.

5. The composition of claim 1, wherein the concentrated neutralized vinegar comprises neutralized vinegar concentrated to about 82% of its original weight.

6. The composition of claim 1, wherein the dissolved oxygen sequestrant comprises a fruit juice concentrate or powder.

7. The composition of claim 1, wherein the dissolved oxygen sequestrant comprises at least one of Jamaican cherry concentrate, acerola concentrate, acerola powder, kakadu plum powder, and camu camu powder.

8. The composition of claim 1, wherein the composition is shelf stable at ambient temperatures above 5° C.

9. The composition of claim 1, wherein the composition has a water activity below about 0.85.

10. The composition of claim 1, wherein the composition is formulated for usage at about 0.10% to about 0.50% of product weight.

11. The composition of claim 1, wherein the product comprises an oil-based sauce or dressing.

12. The composition of claim 1, wherein the content of the Vitamin C in the composition is 4.0 wt. % to 11.8 wt. %.

13. A fruit juice and vinegar based composition for retarding rancidity development in a lipid-containing food product, comprising:
   a heavy metal ion sequestrant comprising a lemon juice component and a vinegar component; and
   a dissolved oxygen sequestrant comprising a fruit juice comprising Vitamin C,
   wherein the lemon juice component comprises a combination of lemon juice concentrate and neutralized lemon juice concentrate,
   wherein the vinegar component comprises a combination of vinegar and concentrated neutralized vinegar,
   wherein the dissolved oxygen sequestrant comprises at least one selected from the group consisting of Jamaican cherry concentrate, acerola concentrate, acerola powder, kakadu plum powder, and camu camu powder, and
   wherein the composition has a pH of about 4.0 to about 4.5.

14. The composition of claim 13, wherein a total content of the Jamaican cherry concentrate, acerola concentrate, acerola powder, kakadu plum powder, and camu camu powder in the composition is 11.83 to 23.6 wt. %, when a total weight of the composition is 100 wt. %.

15. The composition of claim 7, wherein a total content of the Jamaican cherry concentrate, acerola concentrate, acerola powder, kakadu plum powder, and camu camu powder in the composition is 11.83 to 23.6 wt. %.

16. The composition of claim 13, wherein a content of the acerola concentrate in the composition is 11.83 to 23.6 wt. %.

17. The composition of claim 7, wherein a content of the acerola concentrate in the composition is 11.83 to 23.6 wt. %.

18. The composition of claim 13, wherein a content of the lemon juice component is 51.4 to 61.12 wt. %,
   a content of the vinegar component is 25.0 to 27.05 wt. %, and
   a total content of the Jamaican cherry concentrate, acerola concentrate, acerola powder, kakadu plum powder, and camu camu powder is 11.83 to 23.6 wt. %.

19. The composition of claim 1, wherein a content of the lemon juice component is 51.4 to 61.12 wt. %, and
   a content of the vinegar component is 25.0 to 27.05 wt. %.

20. The composition of claim 1, wherein the pH of the composition is 4.0 to 4.5.

21. A system, comprising:
   a lipid-containing food product; and
   a natural sequestrant composition configured to retard rancidity development in the lipid-containing food product,
   wherein a content of the natural sequestrant is 0.10% to 0.55% of a weight of the lipid-containing food product,
   wherein the natural sequestrant comprises:

a heavy metal ion sequestrant comprising a lemon juice component and a vinegar component; and a dissolved oxygen sequestrant comprising a fruit juice comprising Vitamin C, wherein the lemon juice component comprises a combination of lemon juice concentrate and neutralized lemon juice concentrate, wherein the vinegar component comprises a combination of vinegar and concentrated neutralized vinegar, wherein a content of the Vitamin C in the natural sequestrant composition is at least 4.0 wt. % when a total weight of the natural sequestrant composition is 100 wt. %, and wherein the natural sequestrant composition has a pH of about 4.0 to about 4.5.

22. The system according to claim 21, wherein the dissolved oxygen sequestrant comprises at least one selected from the group consisting of Jamaican cherry concentrate, acerola concentrate, acerola powder, kakadu plum powder, and camu camu powder.

23. The system according to claim 21, wherein the content of the Vitamin C in the natural sequestrant composition is 4.0 wt. % to 11.8 wt. %.

24. The system according to claim 23, wherein a content of the lemon juice component in the natural sequestrant composition is 51.4 to 61.12 wt. %, a content of the vinegar component in the natural sequestrant composition is 25.0 to 76.05 wt. %, and a total content of the Jamaican cherry concentrate, acerola concentrate, acerola powder, kakadu plum powder, and camu camu powder in the natural sequestrant composition is 11.83 to 23.6 wt. %.

25. The system according to claim 21, wherein the lipid-containing food product is mayonnaise.

26. The system according to claim 21, wherein the lipid-containing food product is a salad dressing.

* * * * *